(12) United States Patent
Coulson

(10) Patent No.: US 7,308,531 B2
(45) Date of Patent: *Dec. 11, 2007

(54) HYBRID MASS STORAGE SYSTEM AND METHOD

(75) Inventor: Richard L. Coulson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 410 days.

This patent is subject to a terminal disclaimer.

(21) Appl. No.: 10/863,349

(22) Filed: Jun. 9, 2004

(65) Prior Publication Data

US 2004/0225835 A1 Nov. 11, 2004

Related U.S. Application Data

(63) Continuation of application No. 09/745,550, filed on Dec. 26, 2000, now Pat. No. 6,785,767.

(51) Int. Cl.
*G06F 12/08* (2006.01)
*G06F 13/00* (2006.01)

(52) U.S. Cl. ...................... 711/112; 711/103

(58) Field of Classification Search ........ 711/100, 711/103, 104, 112, 113, 154, 200
See application file for complete search history.

(56) References Cited

U.S. PATENT DOCUMENTS

| | | | |
|---|---|---|---|
| 4,723,181 A * | 2/1988 | Hickok | 360/72.2 |
| 4,908,793 A | 3/1990 | Yamagata et al. | |
| 4,972,364 A | 11/1990 | Barrett et al. | |
| 5,046,043 A | 9/1991 | Miller et al. | |
| 5,070,314 A | 12/1991 | Decker | |
| 5,133,060 A | 7/1992 | Weber et al. | |
| 5,197,895 A | 3/1993 | Stupecky | |
| 5,269,019 A | 12/1993 | Peterson et al. | |
| 5,274,799 A | 12/1993 | Brant et al. | |
| 5,347,428 A | 9/1994 | Carson et al. | |
| 5,353,430 A | 10/1994 | Lautzenheiser | |
| 5,442,752 A | 8/1995 | Styczinski | |
| 5,466,629 A | 11/1995 | Mihara et al. | |
| 5,499,337 A | 3/1996 | Gordon | |
| 5,519,831 A | 5/1996 | Holzhammer | |
| 5,526,482 A | 6/1996 | Stallmo et al. | |
| 5,542,066 A | 7/1996 | Mattson et al. | |
| 5,586,291 A | 12/1996 | Lasker et al. | |
| 5,615,353 A | 3/1997 | Lautzenheiser | |

(Continued)

FOREIGN PATENT DOCUMENTS

EP 0702305 3/1996

OTHER PUBLICATIONS

IBM Technical Disclosure Bulletin, vol. 25, No. 2, pp. 459-460, Optical/Magnetic Stoage Disk System, Jul. 1982.*

(Continued)

*Primary Examiner*—Tuan V. Thai
(74) *Attorney, Agent, or Firm*—Kenyon & Kenyon LLP

(57) ABSTRACT

A mass storage system. Two or more dissimilar non-volatile storage mediums have the appearance to an operating system of a single device. In an embodiment, the storage mediums are located within a hard disk drive. In a further embodiment, the non-volatile storage medium is block oriented.

22 Claims, 8 Drawing Sheets

U.S. PATENT DOCUMENTS

| | | | |
|---|---|---|---|
| 5,636,355 | A | 6/1997 | Ramakrishnan et al. |
| 5,701,516 | A | 12/1997 | Cheng et al. |
| 5,764,945 | A | 6/1998 | Ballard |
| 5,787,296 | A | 7/1998 | Grimsrud et al. |
| 5,787,466 | A | 7/1998 | Berliner |
| 5,806,085 | A | 9/1998 | Berliner |
| 5,860,083 | A | 1/1999 | Sukegawa |
| 5,890,205 | A | 3/1999 | Grimsrud et al. |
| 5,918,244 | A | 6/1999 | Percival |
| 5,963,721 | A | 10/1999 | Shiell et al. |
| 6,012,140 | A | 1/2000 | Thomason |
| 6,023,713 | A | 2/2000 | Grimsrud et al. |
| 6,052,789 | A | 4/2000 | Lin |
| 6,072,490 | A | 6/2000 | Bates et al. |
| 6,101,574 | A | 8/2000 | Kumasawa et al. |
| 6,122,711 | A | 9/2000 | Mackenthun et al. |
| 6,165,006 | A | 12/2000 | Yeh et al. |
| 6,175,160 | B1 | 1/2001 | Paniccia et al. |
| 6,178,479 | B1 | 1/2001 | Vishin |
| 6,208,273 | B1 * | 3/2001 | Dye et al. .................. 341/51 |
| 6,263,405 | B1 | 7/2001 | Irie et al. |
| 6,295,577 | B1 | 9/2001 | Anderson et al. |
| 6,370,614 | B1 | 4/2002 | Teoman et al. |
| 6,438,647 | B1 | 8/2002 | Nielson et al. |
| 6,725,342 | B1 | 4/2004 | Coulson |
| 6,785,767 | B2 | 8/2004 | Coulson |

OTHER PUBLICATIONS

Ramtron Int'l. Corp.—"FRAM Technology", Jan. 1994, 2 pages.
NTIS, Dept. of the Navy, "Multi-Wire Cable to Coaxial Cable Transition Apparatus", ADD000450, Jan. 14, 1974, 8 pages.
RAMTRON Application Note "Replacing a Dallas Semiconductor DS1225 with FRAM.RTM. Memory", Feb. 1994, 2 pages.
News Release, "DPT's SmartCache IV RAID/Caching Kits Outperform Adaptec's SCSI Adapters in Independent Tests and Reviews", DPT, Aug. 1, 1996.
DPT's products and tech support "FAW" web page from www.dpt.com as archived by web.archive.com on Jul. 15, 1997.
DPT brochure for Smart IV PM2144W PCI High Performance SCSI Adapter, Cache and RAID upgradable, undated, circa 1997.
Pulvari, "Ferroelectrics and Their Memory Applications", IRE Transactions-Component Parts, Mar. 1956, pp. 3-11.
Auciello et al, "The Physics of Ferroelectric Memories", Physics Today, Jul. 1998, pp. 22-27.
Intel 430HXPCIset Design Guide, Jun. 1997, pp. 1-1 through 6-15.
Moazzami et al, "A Ferroelectric DRAM Cell for High Density NVRAMs", IEEE Electron Device Letters, vol. 11, No. 10, pp. 454-456, Oct. 1990.
Robertson, "Hyundai Enters Japanese-Dominated FeRAM Market", a service of Semiconductor Business News, CMP Media Inc., www.siliconstrategies.com; story posted Sep. 3, 1998.
RAMTRON Int'l. Corp., datasheet for FM1608, dated Dec. 7, 1999.
RAMTRON Int'l. Corp. datasheet for FM24C64, dated Dec. 7, 1999.
Merz & Anderson, "Ferroelectric Storage Devices", Bell Laboratories Record, Sep. 1955, pp. 335-337 and 339-342.
Hodges & Jackson, Analysis and Design of Digital Intergrated Circuits, McGraw-Hill, Inc., 1983, pp. 388-389.
Microsoft Press.RTM. Computer Dictionary, 2.sup.nd Edition, "nondestructive readout", 1994, p. 270.
Derwent-Acc-No. 2000-348269, document ID: RD 431135, Abstract, Mar. 10, 2000.
Related U.S. Appl. No. 09/745,550, filed Dec. 26, 2000.
Patent Abstracts of Japan vol. 18, No. 621, Nov. 25, 1994 and JP 06 236241 A (Sharp Corp.) Aug. 23, 1994, Sharp Corp.
Related U.S. Appl. No. 09/602,011, filed Jun. 23, 2000.
Related U.S. Appl. No. 09/602,010, filed Jun. 23, 2000.
Related U.S. Appl. No. 09/602,008, filed Jun. 23, 2000.
Related U.S. Appl. No. 09/602,009, filed Jun. 23, 2000.
Tanzawa et al, "A Compact On-Chip ECC for Low Cost Flash Memories" IEEE Journal of Solid State Circuits, IEEE Inc., New York, vol. 32, No. 5, pp. 662-668, May 1, 1997.
Intel, 82371FB (PIIX) and 82371SB (PIIX3) PCI ISA IDE Xcelerator data sheet, pp. 1-122, Apr. 1997.
Diefendorff, Keith, "Intel Tries Integrating Graphics", In-Stat MDR, Vo. 12, Issue 11 (from www.mdronline.com), Aug. 24, 1998.
Derowitsch, Rachel, "The Quiet Role of Chipsets", Smart Computing, vol. 9, Issue 8, pp. 70-72, Aug. 1998.
Data sheet—SGS-Thomson Microelectronics GSF32-16.times.16/90 32 MByte SIMM Flash Memory Module, pp. 1-4, Oct. 29, 1997.
Rosenberg, Jerry M., Dictionary of Computers, Information Processing & Telecommunications, 2.sup.nd Edition, p. 221, 1987.
White, Ron, How Computers Work, Chapter 11, "How a Disk Cache Works", pp. 71-73, Ziff-Davis Press, Emeryville, CA, 1993.
IBM Technical Disclosure Bulletin, vol. 25, No. 2, pp. 459-460, Optical/Magnetic Storage Disk System, Jul. 1982.
"Sun StorEdge A5200 Fibre Channel Array And Sun Enterprise 10000 Server Set New Milestones For I/O Speed And Performance," Sun Configuration Delivers 102.000 I/Os Per Second on Nine Terabytes of Data, Palo Alto, Jun. 29, 1999, pp. 1-3.
Mueller, Scott, Upgrading and Repairing PCS, Academic Edition, QUE (publisher), Dec. 2001, pp. 363-366.
Related U.S. Appl. No. 09/669,770, filed Sep. 26, 2000.
Data Sheet—SGS-Thomson Microelectronics GSF32-16×16/90 32 MByte SIMM Flash Memory Module, pp. 1-4, Oct. 29, 1997.
Rosenberg, Jerry M., *Dictionary of Computers, Information Processing & Telecommunications*, 2nd Edition, p. 221, 1987.
*Microsoft Press® Computer Dictionary*, 2nd Edition, "nondestructive readout", 1994, p. 270.
Derwent-Acc- No. 2000-348269, document ID: RD 431135, Abstract, Mar. 10, 2000.
RAMTRON Application Note "Replacing a Dallas Semiconductor DS1225 with FRAM® Memory", Feb. 1994, 2 pages.
DPT's products and tech support "FAQ" web page from www.dpt.com as archived by web.archive.org on Jul. 15, 1997.
DPT Brochure for Smart Cache IV PM2144W PCI High Performance SCSI Adapter, Cache and RAID Upgradable, undated, Circa 1997.

* cited by examiner

HYBRID MASS STORAGE SYSTEM AND METHOD

CROSS-REFERENCE TO RELATED APPLICATION

This application is a continuation application that claims the benefit of U.S. patent application Ser. No. 09/745,550 (filed Dec. 26, 2000) U.S. Pat. No. 6,785,767.

FIELD OF THE INVENTION

Embodiments of the present invention relate to mass storage devices. In particular, the present invention relates to a system and method for storing data for a computer system.

BACKGROUND

There are many different types of storage mediums and devices that computer systems may use to store data. A computer system typically has more than one storage medium. Generally, computer systems store data both in volatile memories and in non-volatile mass storage devices. Non-volatile mass storage devices do not lose the data stored on them when the power to the computer system is removed or turned off. Thus, a non-volatile mass storage device may store data that the computer system is to retain on a permanent basis. Data stored by computer systems often includes instructions, such as for operating system and application programs, and data that is accessed by these instructions.

Examples of memory types that are typically part of a computer system include Random-Access Memory (RAM), Read-Only Memory (ROM), Programmable Read-Only Memory (PROM), flash memory, and Electrically Erasable Programmable Read-Only Memory (EPROM). Such memories are often used to store a relatively small amount of data. By contrast, mass storage devices typically store a relatively larger amount of data. Examples of mass storage mediums are floppy disks, hard disks, optical disks, and tapes. Some other examples of mass storage mediums are ZIP disks (e.g., manufactured by Iomega Corporation of Roy, Utah), Jaz disks (e.g., manufactured by Iomega Corporation), Rewritable Digital Versatile Discs (DVD-RAM), Read/Write Compact Disks (CD-RW), optical storage, magneto-optical storage, magnetic storage, and holographic. Mass storage is considered to be non-volatile.

Devices are subsystems in a computer system. Examples of devices include printers, mice and modems as well as mass storage devices such as hard disk drives and tape drives. Most devices require a device driver program that converts general commands from an application program or operating system into specific commands that the device understands.

In the typical arrangement, operating systems access different storage mediums as different address spaces. Typically, mass storage devices contain a single type of storage medium that is viewed by the operating system as a single device. An example of a mass storage device is a hard disk drive that contains a disk storage medium which typically includes platters on a disk spindle. In this example, when the operating system attempts to access (i.e., read from or write to) a memory location that is stored in the hard disk drive device, the operating system directs a command to the device requesting that the memory location be accessed. That is, an operating system may read from (or write to) a location in a hard disk drive by sending a command to the hard disk device driver requesting that a location be read from (or written to). Because the disk drive is viewed as a single device, this command will not specify a storage medium within the hard disk drive which is to be accessed.

Hard disk drives are common because a unit of hard disk storage is relatively cheap (e.g., as compared to a RAM). However, because the access time for a had disk medium is relatively slow, hard disk drive devices are often a performance bottleneck.

DETAILED DESCRIPTION

The methods and apparatus described herein relate to a hybrid mass storage system for a computer system. In an embodiment, the hybrid mass storage system appears to the computer system's operating system as a single device even though it contains a plurality of dissimilar non-volatile storage mediums. That is, in this embodiment the existence of separate storage mediums is transparent to the operating system. In an embodiment, one of the storage mediums in the hybrid mass storage system is a disk storage medium and the other is not a disk storage medium. In a further embodiment, the storage mediums in the hybrid mass storage system are part of a disk drive.

In an embodiment, the operating system views the mass storage system as a single address space even though one storage medium contains a first part of this address space and a different type of storage medium contains a second part of the address space. In an embodiment, the use of the hybrid storage medium takes advantage of the lower cost of disk storage yet results in better performance than a disk drive because one of the arrays in the hybrid storage device has a faster access time than a disk drive. In a further embodiment, the operating system stores more frequently used data (i.e., "hot data") in the lower part of the hybrid storage device address range, even though the operating system treats the hybrid storage device as having a single disk storage medium, because the lower address range is typically stored in the outer part of the disk and the outer part of the disk has a faster access time. An example of this technique is discussed in U.S. Pat. No. 5,890,205. This further embodiment more advantageously uses the benefits of the faster storage medium by assigning the lower part of the hybrid storage device address range to the faster storage medium (i.e., the operating system unknowingly causes the hot data to be stored on the faster storage medium). A more detailed description of this and other embodiments is provided below.

Figure 1:
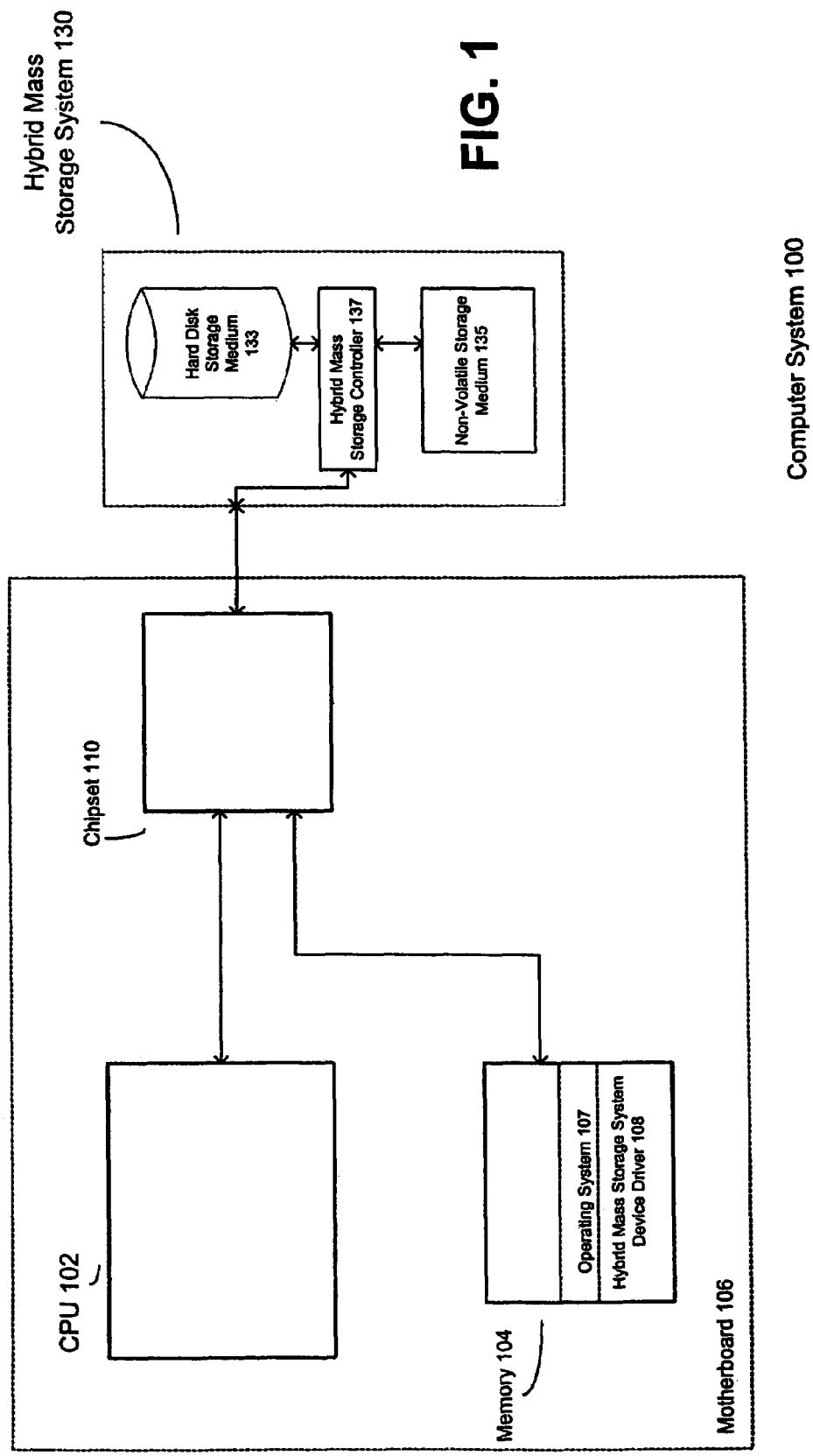
FIG. 1 is a partial block diagram of a computer system that has a hybrid mass storage system according to an embodiment of the present invention.

FIG. 1 shows a partial block diagram of a computer system that has a hybrid mass storage system according to an embodiment of the present invention. In particular, FIG. 1 shows a computer system 100 that includes a central processing unit (CPU) 102, or processor, and a memory unit 104 mounted to a motherboard 106. The processor 102 may be, for example, a Pentium III processor made by Intel Corporation of Santa Clara, Calif., an application specific integrated circuit (ASIC), a microcontroller, etc. An example of a memory 104 that may be used in computer system 100 is a dynamic random access memory device. A chipset 110 is coupled to, and manages interaction between, the processor 102 and other system components, such as the memory 104. The term "coupled" encompasses a direct connection, an indirect connection, an indirect communication, etc. As used in this application, the term chipset refers to a group of one or more integrated circuit chips that acts as a hub (or core) for data transfer between the processor and components of the computer system.

As shown in FIG. 1, computer system 100 contains a hybrid mass storage system 130 coupled to chipset 110. Hybrid mass storage system 130 contains a hybrid mass storage controller 137, a hard disk storage medium 133, and a non-volatile storage medium 135. Hard disk storage medium 133 may be platters on a disk spindle such as is typically found in a hard disk drive. In this embodiment, non-volatile storage medium 135 is a different type of storage medium than hard disk storage medium 133. For example, non-volatile storage medium 135 may be a ZIP disk, a Jaz disk, a flash memory, a battery backed-up DRAM, a magnetic RAM, a holographic memory, or a ferro-electric RAM. In a further embodiment, non-volatile disk storage medium 135 is block-oriented, with each block corresponding to a logical disk sector of a disk drive.

Hybrid mass storage controller 137 may be a processor that runs a stored program, an application specific integrated circuit, a microcontroller, etc. In an embodiment, and as will be discussed further below, hybrid mass storage controller 137 directs requests to access a memory address to either the hard disk storage medium or the non-volatile storage medium based on a mapping of the address requested. That is, each address is mapped to either the hard disk storage medium or the non-volatile storage medium. In an embodiment, the hybrid mass storage system is located within a disk drive device such as is shown with reference to FIG. 3. In other embodiments, the hybrid mass storage system is not located within a disk drive device, or is located partially within a disk drive device, as is shown for example in FIGS. 4-7.

Memory 104 may store, among other things, code for an operating system (OS) 107, which, upon boot-up, may be loaded from a mass storage into memory 104 for execution by the processor 102. Memory 104 may also store device drivers such as a hybrid mass storage device driver 108, which may be loaded into memory 104 for execution by processor 102 to perform data translation and communication with hybrid mass storage system 130.

Figure 2:
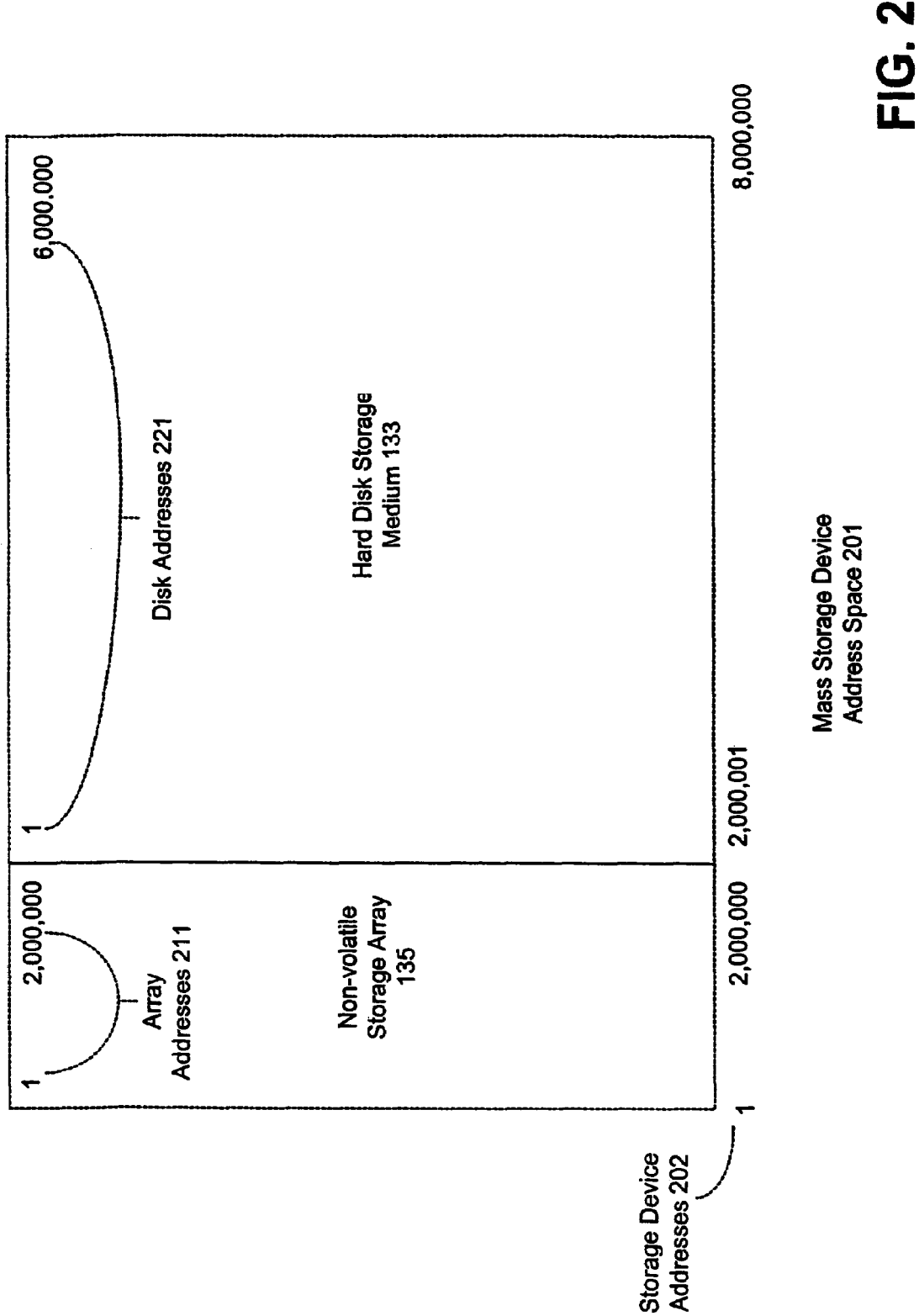
FIG. 2 is a partial block diagram of an address space for a hybrid mass storage device according to an embodiment of the present invention.

FIG. 2 is a partial block diagram of an address space for a hybrid mass storage device according to an embodiment of the present invention. FIG. 2 shows a mass storage device address space 201 which may be a series of memory locations, partitioned between non-volatile storage array 135 and hard disk storage medium 133, that appear to operating system 107 as being stored on a single device such as, for example, hybrid mass storage system 130. In an embodiment, address space 201 contains 40 GigaBytes (GB) of memory. For example, and as is shown in FIG. 2, address space 201 might contain 8 million sectors of 512 bytes each (storage device addresses 202), with non-volatile storage array 135 containing 2 million sectors (array addresses 211) and hard disk storage medium 133 containing 6 million sectors (disk addresses 221). In this example, non-volatile storage array 135 stores sectors 1 to 2,000,000 of mass storage device address space 201 and hard disk storage medium 133 stores sectors 2,000,0001 to 8,000,000 of mass storage device address space 201. Each address in the address spaces maps to a location in either the non-volatile storage array 135 or the hard disk storage medium 133.

An example of the operation of mass storage device address space 201 is as follows. Operating system 107 running on CPU 102 may access data locations in hybrid mass storage system 130, which stores address space 201, by calling the hybrid mass storage system device driver 108 and sending it a request to access a specific data location in the hybrid mass storage system. For example, operating system 107 may send a request to read from sector 1000 and a request to read from sector 3,000,000. From the operating system's point of view, both requests are sent to a single device (i.e., hybrid mass storage system 130). However, sector 1000 may be stored on non-volatile storage array 135 and sector 3,000,000 may be stored on hard disk storage medium 133. When hybrid mass storage controller 137 receives a request to access a location in mass storage device address space 201, hybrid mass storage controller 137 directs the request to the storage medium (e.g., non-volatile storage array 135 or hard disk storage medium 133) to which it is mapped (i.e., to which is assigned to store the address requested). In the example shown in FIG. 2, the hybrid mass storage controller must modify the address that is sent to the hard disk storage medium 133 by subtracting 2,000,000 from the mass storage device address to obtain the hard disk address. By contrast, the address that is sent to the non-volatile storage array 135 does not have to be modified because the address space for the non-volatile array maps directly to the mass storage device address space 201. The existence of separate storage mediums (i.e., non-volatile storage array 135 and hard disk storage medium 133) within hybrid mass storage system 130/hybrid mass storage device address space 201 is transparent to operating system 107.

Figure 3:
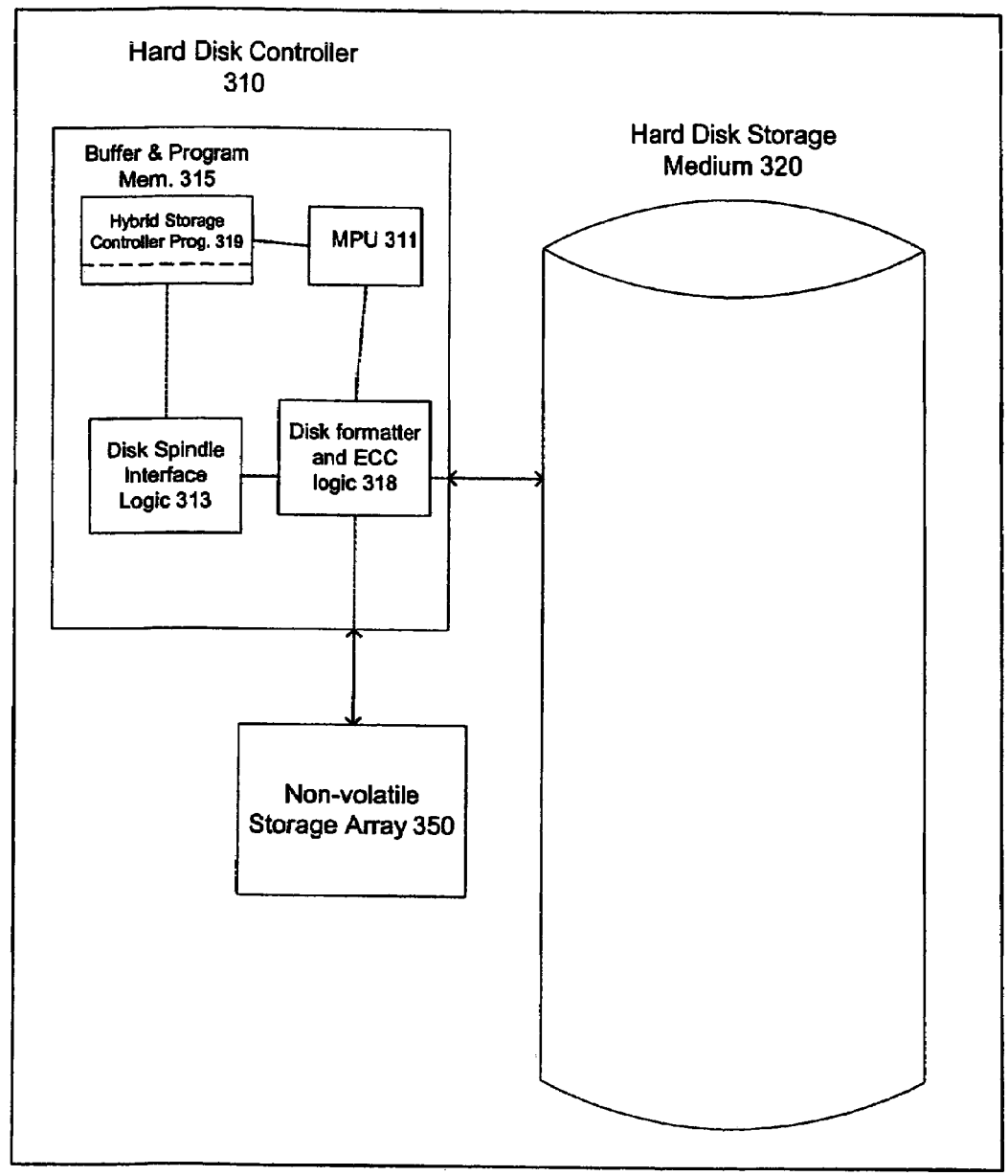
FIG. 3 is a partial block diagram of a hard disk drive according to an embodiment of the present invention.

FIG. 3 shows a partial block diagram of hard disk drive 330 according to an embodiment of the present invention. Hard disk drive 330 may be the sane as hybrid mass storage system 130 of FIG. 1. Hard disk drive 330 may be an external disk drive or an internal disk drive. Hard disk drive 330 may comprise a hard disk controller 310, a hard disk storage medium 320, and non-volatile storage array 350. Hard disk controller 310 may be an application specific integrated circuit and may contain a microprocessor unit (MPU) 311 coupled to a buffer and program memory 315 and Error Correcting Code (ECC) logic 318. Buffer and program memory 318 may store software that is executed by MPU 311, such as a hybrid storage controller program 319. Buffer and program memory 315 may be coupled to disk spindle interface logic 313 which may interface with the host system (e.g., computer system 100). Disk controller 310 may also contain disk formatting logic to format data blocks (e.g., insert a preamble and special characters) that are written to the hard disk drive. As used in this application, "logic" may include hardware logic, such as circuits that are wired to perform operations, or program logic, such as firmware that performs operations.

Disk storage medium 133 may contain platters that may be divided into tracks, which in turn may be divided into sectors. In an embodiment, a block contains identification codes, error detection codes and/or error correcting codes (ECC) for the block. In an embodiment, the OS requests data from the disk drive in terms of a disk sector or block of sectors (i.e., it would not request a byte or word), in which case the disk drive is said to be block-oriented (i.e., block-addressable). ECC is an advanced error detection and correction protocol that may detect single-bit and multi-bit errors and may correct some errors on the fly.

Hybrid storage controller program 319 running on MPU 311 may process requests from CPU 102 to write data to or read data from hard disk drive 330. In an embodiment, hard disk drive 330 appears to the operating system running on CPU 102 as a single device. In this embodiment, CPU 102 sends a memory access request to hard disk drive 330. This request specifies an address to be accessed but does not specify whether the address is located on hard disk storage medium 320 or non-volatile storage array 350. That is, the separate mediums within hard disk drive 330 are transparent to the operating system running on CPU 102. The addresses in the address space of hard disk drive 330 are assigned within hybrid storage controller program 319 to either non-volatile storage array 350 or hard disk storage medium 320. Whenever hard disk controller 310 receives a request to access a location in the address space of hard disk drive 330, hybrid storage controller program 319 directs the request to one of the hard disk storage medium 320 and the non-volatile storage array 350 based on the address requested. For example, if non-volatile storage array 350 stores locations 1 to 2,000,000 (as shown in FIG. 2), then when hybrid storage controller program 319 receives a request to read from a location within the address range from 1 to 2,000, 000, hybrid storage controller program 319 will direct that request to non-volatile storage array 350. In this example, non-volatile storage array will read the location requested and send a copy of the data at that location to hard disk controller 310, which in turns sends the data through to the operating system running on CPU 102. In this example, the operating system was unaware that the data location read from was stored on non-volatile storage array 350. In this embodiment, hard disk drive 330 has the capacity to store data in a plurality of addresses that includes a first set of addresses and a second set of addresses, with the hard disk storage medium having the capacity to store the data corresponding to the first set of addresses and the non-volatile storage array having the capacity to store the data corresponding to the second set of addresses.

When non-volatile storage array 350 has a faster access time than hard disk storage medium 320, the use of non-volatile storage array 350 may, in the aggregate, increase the speed with which processor 102 executes programs. For example, when the average access time for hard disk storage medium 320 is significantly greater than the average access time for non-volatile storage array 350, then the use of non-volatile storage array 350 may lead to a significant increase in overall access speed. Because accesses to the disk drive in a typical computer system may be the cause of up to 80% of the time that a user spends waiting for the system to respond, the use of non-volatile storage array 350 will lead to greater user satisfaction. In addition, when non-volatile storage array 350 uses less power per access than hard disk storage medium 320, then the use of non-volatile storage array 350 may lead to saving in the amount of power used by the system. In addition, non-volatile storage array 350 may be more reliable than a hard disk storage medium, thus minimizing the times when the computer system crashes or becomes inoperable.

In an embodiment, hybrid storage controller 315 modifies the address for which an access is requested, with this modification resulting in a modified address, and sends the modified address to the appropriate storage medium as part of the memory access request. For example, and as is discussed with reference to FIG. 2, the addresses 1 to 2,000,000 may be assigned to non-volatile storage array 350 and the addresses 2,000,001 to 8,000,000 may be assigned to hard disk storage medium 320. In an embodiment, an address or sector that is frequently accessed may be assigned to the faster storage medium in order to improve system performance. For example, a sector such as the sector containing location 5,000,000 may originally be assigned to the hard disk storage medium. If that sector is accessed more than a threshold number of times, then that sector may be copied to the non-volatile storage array 350 and reassigned to non-volatile storage array 350 for the purposes of later access. In addition, and as is discussed below, the operating system may store hot data in the lower part of the hybrid storage device address range, even though the operating system views the hybrid storage device as a single disk storage medium, because the lower address range is typically stored in the faster part of the disk. Examples of application runtime and launch acceleration patents optimization techniques such as this are discussed in U.S. Pat. No. 5,787,296, U.S. Pat. No. 5,890,205, and U.S. Pat. No. 6,023,713.

Figure 4:
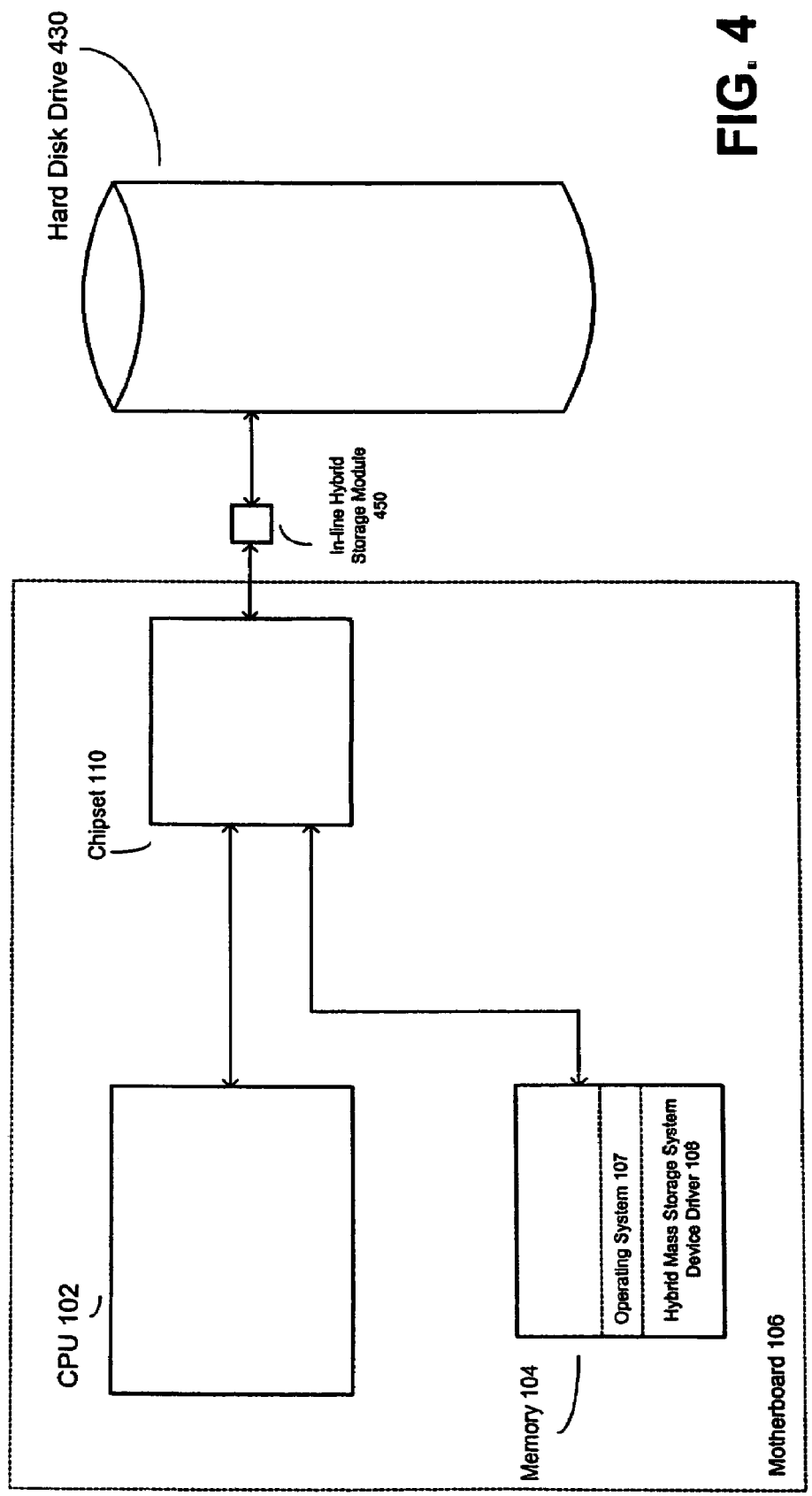
FIG. 4 is a partial block diagram of a computer system that has an in-line hybrid storage module according to an embodiment of the present invention.

FIG. 4 is a partial block diagram of a computer system 400 that has an in-line hybrid storage module according to an embodiment of the present invention. Computer system 400 includes motherboard 106, CPU 102, chipset 110, and memory 104 as discussed above with reference to FIG. 1. Memory 104 stores operating system 107 and hybrid mass storage system device driver 108 also as discussed above. In FIG. 4, chipset 110 is coupled to in-line storage module 450, which is coupled to hard disk drive 430. Hard disk drive 430 may be a standard hard disk drive device that stores, for example, 30 GB of data.

Figure 5:
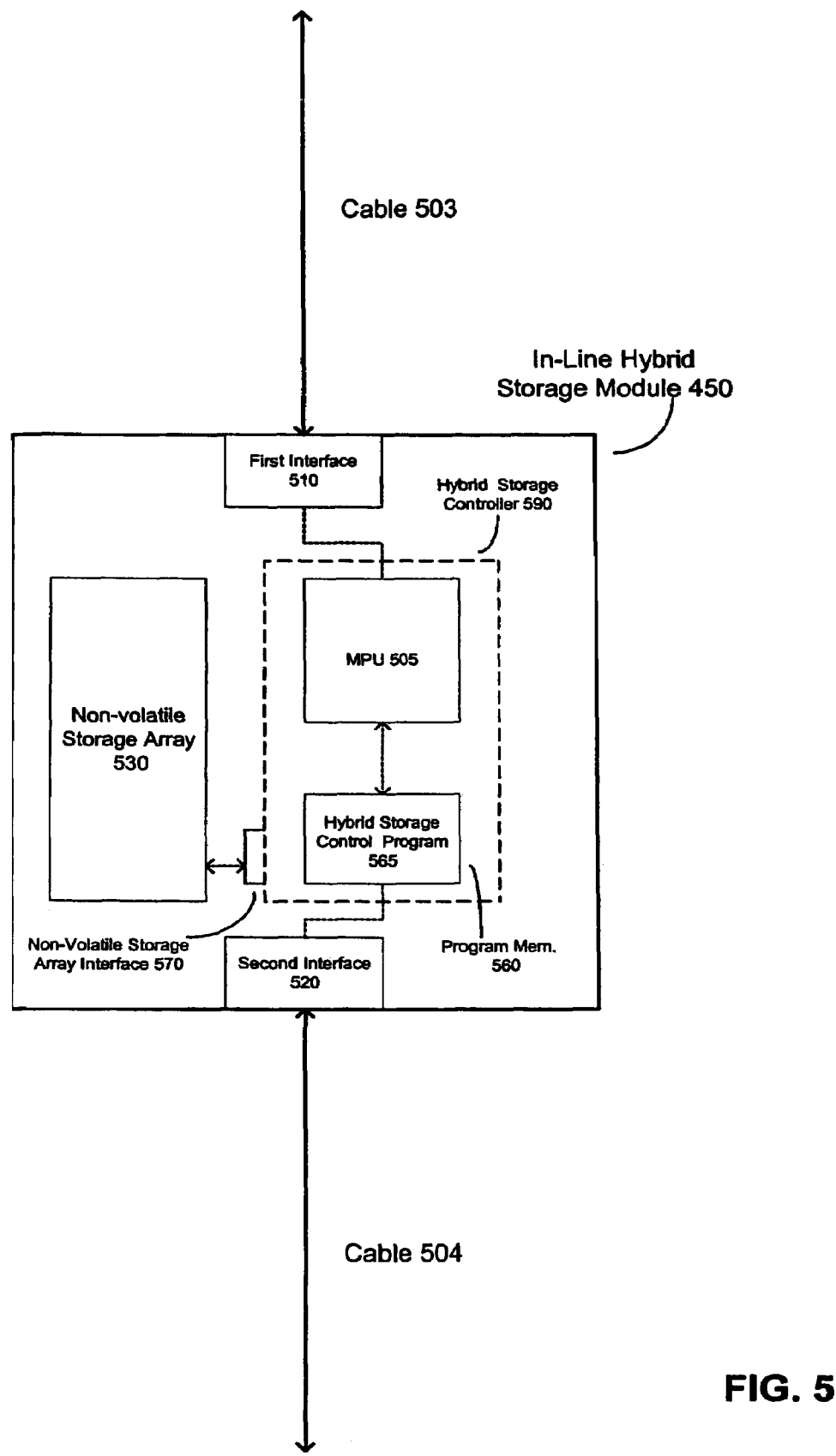
FIG. 5 is a more detailed partial block diagram of an in-line hybrid storage module according to an embodiment of the present invention.

FIG. 5 is a more detailed partial block diagram of in-line hybrid storage module 450 according to an embodiment of the present invention. In-line hybrid storage module 450 may contain a non-volatile storage array 530 that is a different type of storage medium than is in disk drive 430. In-line hybrid storage module 450 may also contain a hybrid storage controller 590. In the embodiment shown in FIG. 5, hybrid storage controller 590 includes an MPU 505, program memory 560, and a hybrid storage control program 565 stored in program memory 560. In another embodiment, hybrid storage controller 590 may be an ASIC. In-line storage module 450 may include a cable 503 which is coupled to the body of the hybrid storage module at a first interface 510 and a cable 504 which is coupled to the body of the hybrid storage module at a second interface 520. First interface 510 and second interface 520 may be ATA interfaces or equivalent. First interface 510 and second interface 520 are coupled to hybrid storage controller 590. Hybrid storage controller 590 may include a non-volatile storage array interface 570 that is coupled to non-volatile storage array 530. Non-volatile storage: array 530 may store, for example, 10 GB of data.

In an embodiment, the hybrid storage controller 590 may receive a memory access request though first interface 510 (i.e., from an operating system) and may direct the memory access requests to either the non-volatile storage array 530 or through second interface 520 (i.e., to the hard disk drive 430) based on the address to be accessed. For example, non-volatile storage array 530 may store the first 10 GB of a hybrid mass storage device address space and the disk drive 430 may store the next 30 GB of the hybrid mass storage device address space. In an embodiment, the existence of in-line hybrid storage module 450 is transparent to the operating system and the device driver. That is, in-line storage module 450 and the disk drive 430 appear to the operating system and the device driver as a single device.

In an embodiment, in-line hybrid storage module 450 is part of a connector cable that may be used in place of a standard connector cable to connect hard disk drive 430 to motherboard 106. Because the in-line hybrid storage module 450 and hard disk drive 430 both share part of the same address space, it is preferable that the in-line hybrid storage module 450 not be removed from the hard disk drive 430 or, if it is, that both components be reconfigured whenever they are separated. In this embodiment, the device driver may need to be updated when the in-line storage module is removed to reflect the smaller size of the hybrid mass storage device address space.

Figure 6:
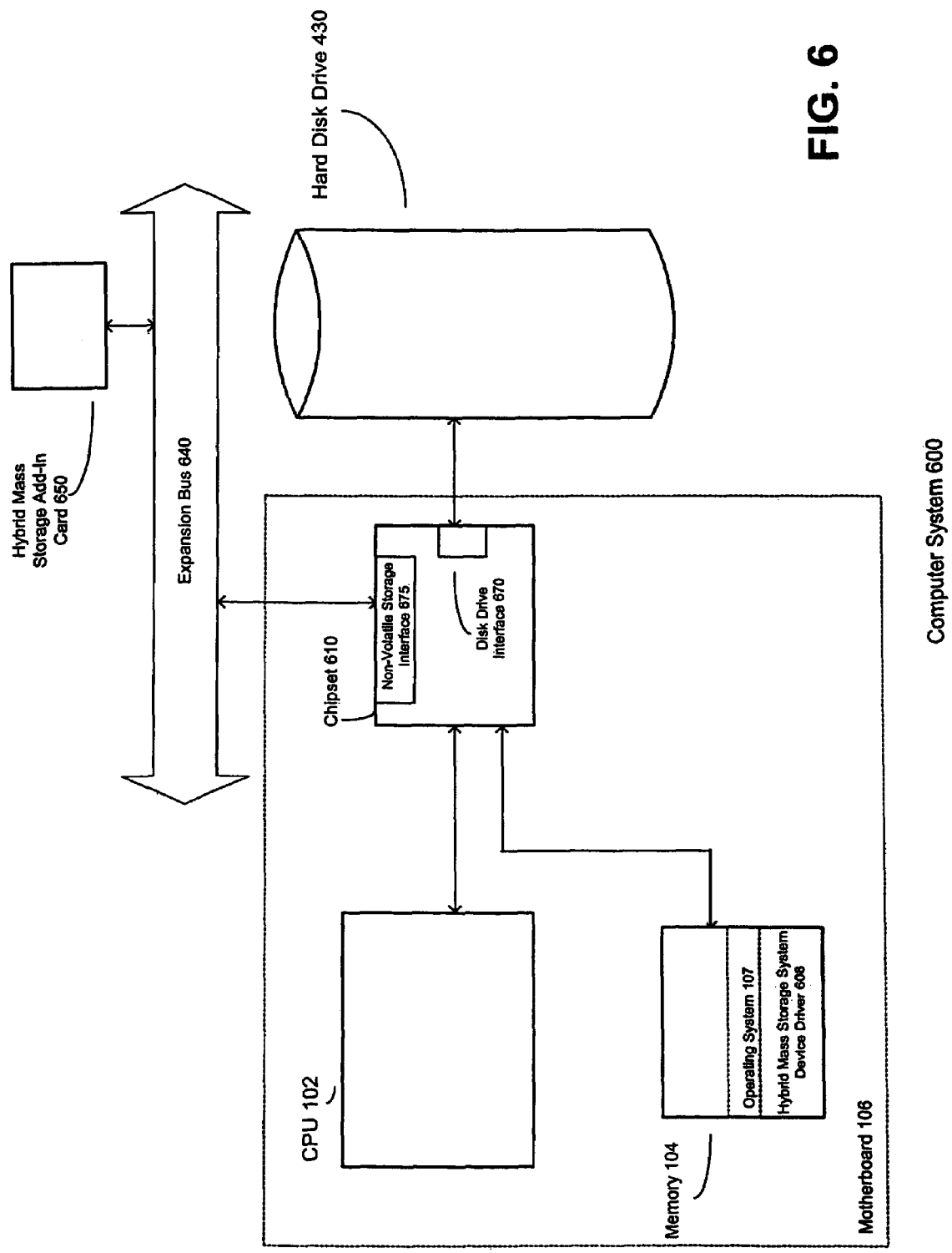
FIG. 6 is a partial block diagram of a computer system that has a hybrid mass storage add-in card according to an embodiment of the present invention.

FIG. 6 is a partial block diagram of a computer system 600 that has a hybrid mass storage add-in card 650 according to an embodiment of the present invention. In this embodiment, the physical memory for the hybrid mass storage device address space includes the hard disk drive memory and memory located in hybrid mass storage add-in card 650. Computer system 600 includes motherboard 106, CPU 102, chipset 610, and memory 104 as discussed above with reference to FIGS. 1 and 4. Memory 104 stores operating system 107 and hybrid mass storage system device driver 608. Chipset 610 has a disk drive interface 670 which is coupled to hard disk drive 430 and which may be an ATA interface cable or equivalent. Chipset 610 also has a non-volatile storage interface 675 that is coupled to expansion bus 640, which in turn is coupled to hybrid storage add-in card 650.

Expansion bus 640 may be a collection of wires and protocols that allows the expansion of computer system 600 by inserting circuit boards (expansion boards). Expansion bus 640 may be an internal bus or an external bus. In addition, expansion bus 640 may be any type of expansion bus. For example, expansion bus 640 may be a universal serial bus (USB), an external bus that complies with the USB standard. Expansion bus 640 may also be an ISA bus or a bus that supports the Institute of Electrical and Electronics Engineers (IEEE) 1394 standard. In an embodiment, expansion bus 116 is a peripheral component interface (PCI) bus, which is a type of data bus often found in the computer system 100 and which complies with a PCI Local Bus Specification, such as "PCI Local Bus Specification Rev. 2.2", published on Dec. 18, 1998, by the PCI Special Interest Group. One or more devices, such as a network interface card (NIC), may be connected to the expansion bus 640. Non-volatile storage interface may be an interface that is appropriate for communicating over expansion bus 640.

Hybrid mass storage add-in card 650 is an expansion card that maybe added or removed from expansion bus 640. Hybrid mass storage add-in card 650 contains a non-volatile storage array that may be part of a hybrid mass storage system address space. In an embodiment, hybrid mass storage system device driver 608 performs the hybrid mass storage control function which is assigned to the hybrid storage controller program 319 of FIG. 3 and the hybrid storage control program 565 of FIG. 5. That is, hybrid mass storage system device driver 608 is aware that the hybrid mass storage device address space is partitioned between the hybrid mass storage add-in card 650 and the disk drive 430. In this embodiment, the hybrid mass storage system device driver 608 appears to the OS 107 as if it were a normal device driver for a disk drive (e.g., ATAPI.SYS in a WIN98 environment) even though it has hybrid mass storage system control instructions. In this embodiment, and as discussed above, the existence of hybrid mass storage add-in card 650 as a separate device is transparent to OS 107. That is, hybrid mass storage add-in card 650 and disk drive 430 appear as a single device to the operating system. Because the hybrid mass storage add-in card 650 and hard disk drive 430 both share part of the same address space, it is preferable that the hybrid mass storage add-in card 650 not be removed from the hard disk drive 430 or, if it is, that both components be reconfigured whenever they are separated. To discourage the separation of these devices, it is more advantageous that the hybrid mass storage add-in card 650 be attached to an internal bus than an external bus.

Figure 7:
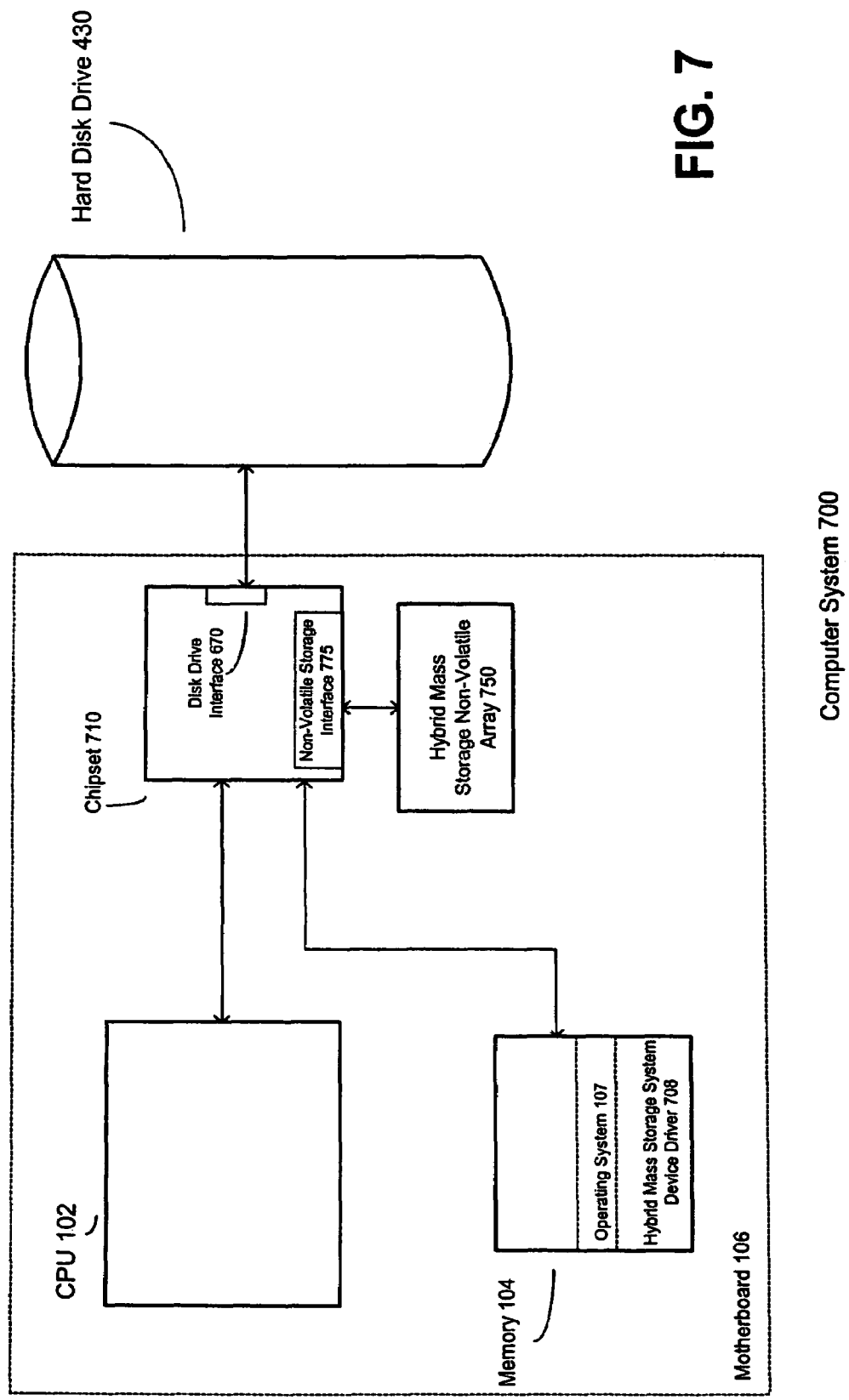
FIG. 7 is a partial block diagram of a computer system that has a hybrid mass storage non-volatile array according to an embodiment of the present invention.

FIG. 7 is a partial block diagram of a computer system 700 that has a hybrid mass storage non-volatile array 750 according to an embodiment of the present invention. In this embodiment, the physical memory for the hybrid mass storage device address space includes the hard disk drive memory and memory located in hybrid mass storage non-volatile array 750. Computer system 700 includes motherboard 106, CPU 102, chipset 710, and memory 104 as discussed above with reference to FIGS. 1 and 4. Memory 104 stores operating system 107 and hybrid mass storage system device driver 708. Chipset 710 has a disk drive interface 670 which is coupled to hard disk drive 430 and which may be an ATA interface or equivalent. Chipset 710 also has a non-volatile storage interface 775 that is coupled to hybrid mass storage non-volatile array 750.

Hybrid mass storage non-volatile array 750 is a non-volatile storage array that may be part of a hybrid mass storage system address space. In an embodiment, hybrid mass storage system device driver 708 performs the hybrid mass storage control function. That is, hybrid mass storage system device driver 708 is aware that the hybrid mass storage device address space is partitioned between hybrid mass storage non-volatile array 750 and disk drive 430. In this embodiment, the hybrid mass storage system device driver 708 appears to the OS 107 as if it were a normal device driver. As is discussed above, the existence of hybrid mass storage non-volatile array as a separate device is transparent to OS 107. That is, hybrid mass storage non-volatile array 750 and disk drive 430 appear as a single device to the operating system. Because the hybrid mass storage non-volatile array 750 and hard disk drive 430 both share part of the same address space, it is preferable that the hybrid mass storage non-volatile array 750 not be removed from the hard disk drive 430 or, if it is, that both components be reconfigured whenever they are separated.

Chipset 110, 610, and 710 may be a single integrated circuit or group of integrated circuits that control communication between a processor and associated devices. In an embodiment, the chipset comprises multiple integrated circuits, which may be referred to as a first chipset integrated circuit and a second chipset integrated circuit, and the non-volatile disk cache may be coupled to one of the integrated circuits in the chipset. The chipset may include a memory control hub (MCH) which performs what is known as "northbridge functionality," and an input/output controller hub (ICH), which performs what is known as "southbridge functionality." The memory control hub and input/output control hub may be separate chips.

Figure 8:
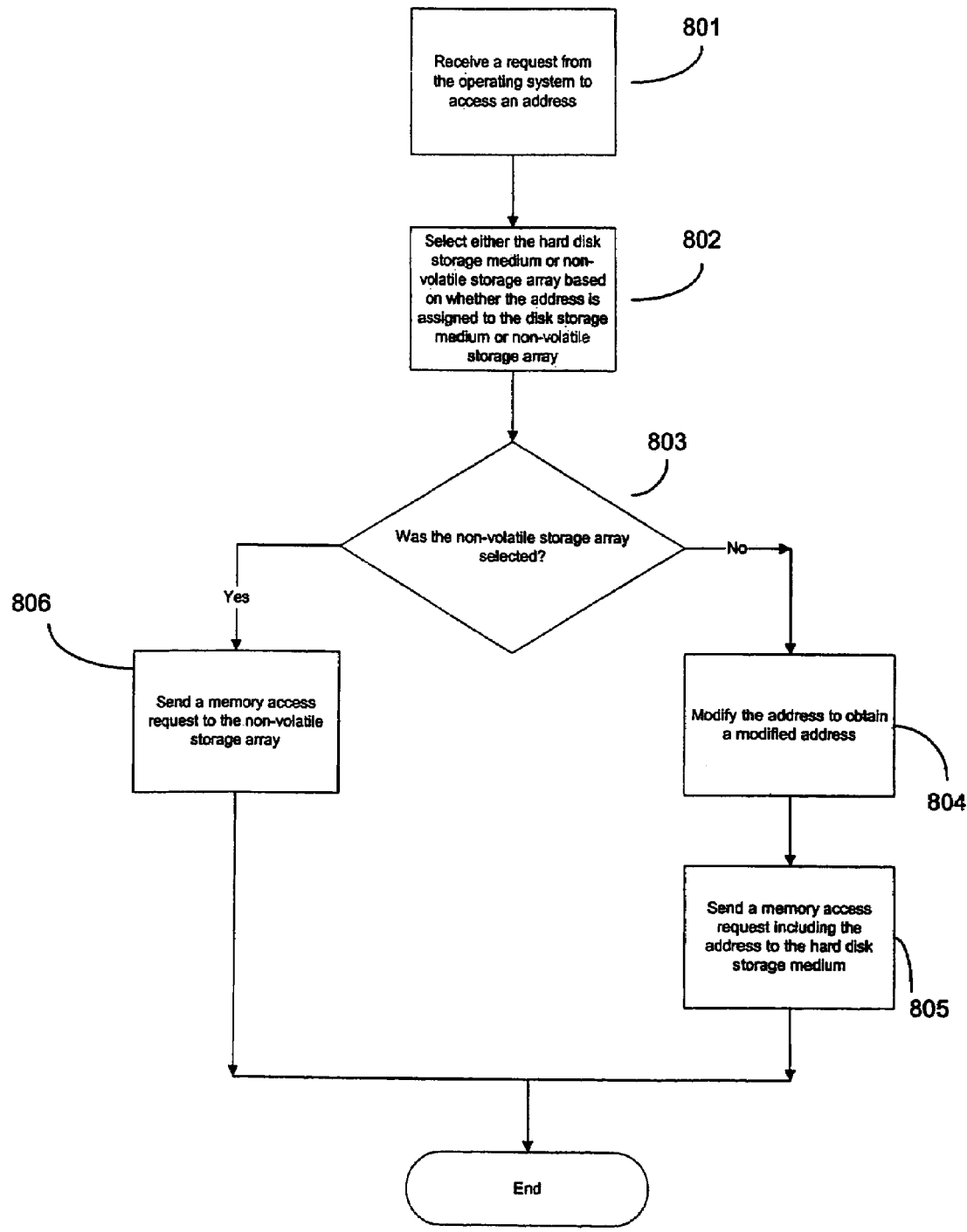
FIG. 8 is a flow chart of a method of accessing an address in a hybrid mass storage system according to an embodiment of the present invention.

FIG. 8 is a flow chart of a method of accessing an address in a hybrid mass storage system according to an embodiment of the present invention. This method may be performed, for example, by hybrid mass storage controller 137 of FIG. 1, hybrid storage controller program 319 of FIG. 3, hybrid storage control program 565 of FIG. 5, hybrid mass storage device driver 608 of FIG. 6, or hybrid mass storage device driver 708 of FIG. 7. In the embodiment shown in FIG. 8, a request is received from the operating system to access an address (801). For example, the operating system 107 running on CPU 102 may make a request to access an address in mass storage device address space 201, and this request may be received by the hybrid storage controller. The controller selects either the hard disk storage medium or non-volatile storage array based on whether the address is assigned to the disk storage medium or non-volatile storage array (802). If the hard disk storage medium was selected (803), the address is modified to obtain a modified address (804) and a memory access request which includes the modified address is sent to the hard disk storage medium (805). If the non-volatile storage array was selected (803), then a memory access request is sent to the non-volatile storage array (806).

Embodiments of the present invention relate to a hybrid mass storage device. Several embodiments of the present invention are specifically illustrated and/or described herein. However, it will be appreciated that modifications and variations of the present invention are covered by the above teachings and within the purview of the appended claims without departing from the spirit and intended scope of the invention. For example, although several types of non-volatile mediums are discussed for use in the hybrid mass storage device, any type of non-volatile medium may be used. Moreover, the hybrid mass storage device may be implemented as part of a chipset, as an extension card, as part of the disk drive, or in another part of the computer system, such as within a disk drive connector cable.

I claim:

1. A hybrid mass storage system, the system comprising a first non-volatile storage medium to contain an upper part of a single address space and a second non-volatile storage medium to contain a lower part of the single address space, wherein the first and second storage mediums are different types of storage mediums, and wherein one of the storage mediums has a faster access time than the other storage medium.

2. The hybrid mass storage system of claim 1, wherein the first and second storage mediums are block oriented.

3. The hybrid mass storage system of claim 1, wherein the first storage medium is a hard disk storage medium and the second storage device is not a hard disk storage medium.

4. The hybrid mass storage system of claim 1, wherein the first storage medium is a hard disk storage medium and the second storage medium has a faster access time than the hard disk storage medium.

5. The hybrid mass storage system of claim 1, wherein the first storage medium and second storage medium are contained in a disk drive device.

6. A hard disk drive device for storing a plurality of addresses in an address range, the hard disk drive device comprising:
a hard disk storage medium;
a non-volatile storage array that is a different type of storage medium than the hard disk storage medium; and
a controller coupled to the hard disk storage medium and the non-volatile storage array to direct a request to access a memory address to one of the hard disk storage medium and the non-volatile storage array based on a mapping of the address requested, wherein the hard disk storage medium is to store a part of the addresses in the address range for the hard disk drive device and the non-volatile array is to store a different part of the addresses in the address range for the hard disk drive device.

7. The bard disk drive device of claim 6, wherein the controller is part of a hard disk controller, and wherein the non-volatile storage array is block oriented.

8. The hard disk drive device of claim 6, wherein the non-volatile storage array has a faster access time than the hard disk storage medium.

9. A hybrid mass storage system comprising:
a disk drive interface;
a non-volatile storage array interface; and
a controller coupled to the disk drive interface and non-volatile storage array interface to direct a request to access the mass storage system to either the disk drive interface or the non-volatile storage array interface based upon whether an address that is requested is assigned to a disk drive or a non-volatile storage array, wherein the hybrid mass storage system appears to an operating system as a single device having an address space, wherein a first range of addresses in the address space is assigned to the disk drive and an second range of address in the address range is assigned to the non-volatile storage array.

10. The hybrid mass storage system of claim 9, wherein the non-volatile storage array interface is an interface to a type of storage medium other than a hard disk storage medium.

11. The hybrid mass storage system of claim 9, wherein at least part of the hybrid mass storage system is located in an in-line module that has a host interface, and wherein the host interface and disk drive interface are both the same type of interface.

12. The hybrid mass storage system of claim 9, wherein the disk drive interface and non-volatile storage array interface are part of a chipset.

13. The hybrid mass storage system of claim 9, wherein the non-volatile storage array interface is an expansion bus interface.

14. A computer system comprising:
a microprocessor; and
a hybrid mass storage system which is coupled to the microprocessor and is accessed by the microprocessor as a single device having an address space, the mass storage system comprising:
a hard disk storage medium to store a first range of addresses in the address space;
a non-volatile storage array that is a different type of storage medium than the hard disk storage medium to store a second range of the addresses in the address space; and
a controller coupled to the hard disk storage medium and non-volatile storage array to direct a request to access the hybrid mass storage system to either the disk medium or the non-volatile storage array based upon an address that is requested.

15. The computer system of claim 14, wherein the hybrid mass storage system is part of a hard disk drive.

16. The computer system of claim 14, wherein the hard disk storage medium is part of a hard disk drive, and wherein the non-volatile storage array and controller are part of an in-line module that is coupled between the microprocessor and the hard disk drive.

17. A method of accessing an address in an address space that an operating system assigned to a non-volatile storage device, the meted comprising:
   receiving a request from the operating system to access an address in an address space;
   selecting either a hard disk storage medium or a non-volatile storage array based on whether the address is assigned to the hard disk storage medium or the non-volatile storage array, wherein the non-volatile storage array is a different type of storage medium than the hard disk storage medium, and wherein the hard disk storage medium is assigned to a part of the address space and the non-volatile storage array is assigned to a different part of the address space; and
   sending a memory access request to either the hard disk storage medium or the non-volatile storage array according to the selection made.

18. The method of claim 17, wherein said selecting is transparent to the operating system.

19. A machine-readable medium having stored thereon a plurality of executable instructions, the plurality of instructions comprising instructions to:
   receive a request from an operating system to access an address in an address space, wherein the address space is assigned within the operating system to a non-volatile memory device;
   select either a hard disk storage medium or a non-volatile storage array based on the address requested, wherein the non-volatile storage array is a different type of storage medium than the hard disk storage medium, and wherein the hard disk storage medium is assigned to a part of the address space and the non-volatile storage array is assigned to a different part of the address space; and
   send a memory access request to either the hard disk storage medium or the non-volatile storage array according to the selection made.

20. The machine-readable medium of claim 19, wherein the plurality of executable instructions are part of a device driver for a disk drive.

21. The machine-readable medium of claim 19, wherein the plurality of executable instructions are part of a device driver for a disk drive, and wherein the selection is transparent to the operating system.

22. The machine-readable medium of claim 19, wherein the plurality of executable instructions are part of a hard disk controller.

\* \* \* \* \*

UNITED STATES PATENT AND TRADEMARK OFFICE
CERTIFICATE OF CORRECTION

PATENT NO. : 7,308,531 B2  
APPLICATION NO. : 10/863349  
DATED : December 11, 2007  
INVENTOR(S) : Richard L. Coulson Page 1 of 1

It is certified that error appears in the above-identified patent and that said Letters Patent is hereby corrected as shown below:

| | | |
|---|---|---|
| Column 10, | Line 14 | "bard" should be --hard-- |
| Column 10, | Line 32 | "an second range" should be --a second range-- |
| Column 11, | Line 10 | "meted" should be --method-- |

Signed and Sealed this

Twenty-ninth Day of April, 2008

JON W. DUDAS  
*Director of the United States Patent and Trademark Office*